3,082,059
PROCESS FOR THE TREATMENT OF AQUEOUS SOLUTIONS
Mayer B. Goren, Denver, Colo., assignor to Kerr-McGee Oil Industries, Inc., a corporation of Delaware
No Drawing. Filed June 15, 1960, Ser. No. 36,162
10 Claims. (Cl. 23—1)

This invention relates to a novel process for regenerating an activated carbon catalyst and, in one of its more specific aspects, to an improved process for the reduction of ferric ion to ferrous ion using a water soluble substance yielding sulfite ion or bisulfite ion as the reductant in the presence of activated carbon as a catalyst.

In various chemical processes and especially in the hydrometallurgical field, it is frequently necessary or desirable to eliminate the deleterious effects of ferric ion in order to permit subsequent processing steps to be practiced. Examples of such processes include the decomposition of alkali chlorotitanates to produce titanium tetrachloride, the solvent extraction of metal values in hydrometallurgical processes, and the recovery of copper, titanium and vanadium in hydometallurgical processes where ferric ion is present in aqueous solution.

The deleterious effects of ferric ion may be eliminated by either chelating with a suitable chelating agent or by reducing the ferric ion to ferrous ion. Of these processes, the reduction process is generally preferred in the hydrometallurgical art. The ferric ion content of acidic leach liquors has been reduced heretofore by treating the liquor with scrap iron or aluminum and, while the ferric ion content of the liquor is reduced by this process, certain disadvantages are present which render the process unsatisfactory. For instance, the hydrogen produced as a by-product is a fire and explosion hazard, the free acid content of the liquor is lowered, and cutting oils or other contaminates on the scrap metal may present operational problems in solvent extraction operation due to the detergent content. Sulfide-type reductants such as sodium or potassium sulfide also have been used to reduce ferric ion, but these substances are unsatisfactory due to their poisonous nature, offensive odor, and their ability to precipitate group II metal values such as copper, arsenic, bismuth and lead.

One prospective reductant which would overcome the above-mentioned disadvantages which has been considered for the reduction of ferric ion to ferrous ion is sulfur dioxide in either the gaseous form or aqueous solution (sulfurous acid). Thermodynamically, sulfur dioxide should be ideally suited for this purpose since the sulfite-sulfate ion couple appears to have sufficient potential to readily reduce the ferric-ferrous ion couple. Unfortunately, results are disappointing in the absence of a catalyst since the rate of reduction is very slow and the reaction seldom goes to completion even upon warming the solution to a temperature near the boiling point of water. One effective catalyst is thiocyanate ion and, as disclosed in my copending application Serial No. 741,716, filed June 13, 1958, now United States Patent 2,959,462, it has been discovered that thiocyanate ion possesses highly unusual properties for catalyzing the reduction of ferric ion by sulfur dioxide or its equivalents.

There are other catalysts for the above-mentioned sulfur dioxide-ferric ion reaction. In accordance with one process, ferric ion is reduced in aqueous solution by means of sulfur dioxide under the catalytic influence of activated carbon. In practicing the process, the aqueous solution containing ferric ion may be passed through a vessel packed with substantially pure activated carbon and sulfur dioxide gas is passed through the vessel counter-current to the solution. However, this process has failed from a commercial standpoint as it is entirely unsatisfactory in the amount of ferric ion reduced to ferrous ion and the efficiency of use of the sulfur dioxide reductant.

As disclosed in my copending application Serial No. 36,163, filed June 15, 1960, for "Treatment Of Aqueous Solutions," the teachings of this application being incorporated herein by reference, I have made the surprising discovery that the efficiency of sulfur dioxide or its equivalent such as soluble sulfite or bisulfite is multiplied many times by the expedient of passing the aqueous solution and the reductant concurrently through a bed of activated carbon rather than countercurrently. Unexpectedly, operating in accordance with the teachings of my copending application results in more efficient utilization of the reducing agent, the ferric ion content is much more completely reduced and the capacity of the activated carbon bed is increased many times.

The activated carbon catalyst used in the above-mentioned processes gradually exhibits reduced catalytic activity with the result that the catalyst becomes less and less effective with continued use. This is manifested by a marked decrease in the efficiency of the catalyst, a longer residence time to effect complete reduction, and larger excesses of reducing agent to achieve the same degree of reduction. Accordingly, the course of a commercial operation soon reaches a level where reduction with sulfur dioxide and its equivalents in the presence of activated carbon as a catalyst becomes uneconomical and the catalyst must be replaced with fresh activated carbon. While this is costly in the use of the sulfur dioxide reductant and activated carbon, prior to the present invention a process was not known for regenerating the spent catalyst and thus restoring or improving the catalytic activity.

It is an object of the present invention to provide a novel process for regenerating activated carbon catalyst whereby the catalytic activity may be improved.

It is a further object of the present invention to provide a novel process for regenerating spent activated carbon catalyst which has been used in the reduction of ferric ion to ferrous ion using a water soluble substance yielding sulfite ion or bisulfite ion as the reductant.

It is still a further object of the present invention to provide an improved process for reducing ferric ion to ferrous ion when using a water soluble substance yielding sulfite or bisulfite ion as the reductant and activated carbon as a catalyst.

Still other objects and advantages of the present invention will be apparent to those skilled in the art upon reference to the following detailed description and the example.

It has been discovered that the catalytic activity of spent or poisoned activated carbon used as a catalyst in a process for the reduction of ferric ion to ferrous ion by means of a water-soluble substance yielding sulfite ion or bisulfite ion may be improved by treatment with aqueous solutions of acids and bases. The most simple combination of inexpensive reagents has been determined to be treatment with an aqueous alkaline solution, either preceded or followed by treatment with an aqueous acid solution.

Among the alkaline reagents which are operative in practicing the present invention are the alkali hydroxides, carbonates and bicarbonates, such as sodium and potassium hydroxides, carbonates, and bicarbonates. Additionally, ammonium hydroxide, carbonate and bicarbonate may be used. While the concentration of the alkaline reagent may vary over a wide range, usually it is preferred that a 2–30% by weight aqueous solution be used.

With the exception of phosphoric acid, a wide variety of acids are suitable for practicing the present invention. Mineral acids such as sulfuric, hydrochloric, hydrofluoric, and nitric acids are especially suitable. The concentration of the acidic solution also may vary widely, but usually for economic reasons it is preferred that a dilute aqueous acidic solution be used. The acidic solution may be 0.3–12 N in the desired mineral acid, and, preferably, 0.3–6 N.

Any sequence of treatments with the above-mentioned acid and alkaline aqueous solutions may be used advantageously, but the efficiency of the regeneration process in terms of the amount of reagents required and contact times varies somewhat according to the sequence employed. For instance, a very effective sequence consists of at least one alkaline solution treatment followed by a treatment with the acid solution. In some instances, more complete regeneration may be achieved by also treating the spent activated carbon with an alkaline carbonate or bicarbonate solution in addition to an alkaline hydroxide solution. Additionally, the presence of a small amount of an oxidizing agent such as nitric acid or sodium chlorate is beneficial. For example, the acidic solution may be 0.025–0.25 molar or higher in nitrate ion, or a 0.01–1% aqueous solution of sodium chlorate may be used. Water washes may be used at any stage of the process as desired. For instance, a water wash may precede treatment with either the acid or alkaline solution, and a water wash may be used for removing any remaining traces of either the acid or alkaline reagent after a given treatment has been completed. A very effective sequence of treatments involves the following series of steps:

(1) Dilute acid percolation
(2) Water wash
(3) Dilute base percolation
(4) Water wash
(5) Dilute acid plus a trace of oxidant
(6) Water wash While the alkaline and acidic reagents above described may be used at any convenient temperature, such as a temperature from ambient temperature to the boiling point of the aqueous solution, it is usually preferred that the solution be warmed to at least 60° C. At lower temperatures than 60° C., it may be desirable to extend the time of contact to 1–12 hours, while at higher temperatures such as 80–100° C., contact times as short as 10–30 minutes are usually satisfactory but much longer periods of contact such as 2–8 hours may be desirable.

A plurality of acidic solutions may be used with each acidic treatment being preceded or followed by treatment with an alkaline reagent. Also, it is often beneficial to change the type of acid or alkaline reagent employed when a plurality of acidic or alkaline reagents are used successively. For instance, where a plurality of alkaline treatments are to be used, one alkaline substance may be a hydroxide, the second a carbonate and the third a bicarbonate. Similarly, where a plurality of acidic treatments are carried out, the first acid treatment may be with nitric acid, the second with hydrochloric acid, and the third with sulfuric acid. The catalyst is contacted with the solutions for as long as desired or to effect a given degree of improvement in catalytic activity.

The following specific example is for the purpose of illustration only, and is not intended as being limiting to the spirit or scope of the appended claims.

*Example*

A column containing 80 ml. of activated charcoal (+30 mesh) was employed in catalyzing the $SO_2$ reduction of ferric ion contained in an acidic vanadium leach liquor. With continued operation of the column, the activated carbon catalyst exhibited a gradual reduction in catalytic activity with the result that the efficiency of the reduction began to suffer.

When the catalyst was fresh, a leach liquor flow rate of 30 ml./minute (one column volume every 2.68 minutes) and an $SO_2$ dosage of 89 ml. of 6% aqueous $SO_2$ for 10 liters of feed produced an effluent liquor having a potential of −261 millivolts when tested with conventional platinum and saturated calomel electrodes. Substantially all of the iron is present in the ferrous form at a potential of −300 mv. or less, i.e., at more positive values. The E.M.F. (electromotive force or potential) of the starting liquor was about −440 mv., indicating that it contained ferric ion, while the potential of −261 mv. of the effluent liquor indicated that it contained essentially no ferric ion.

During the course of treating 120 liters of liquor over a period of several days, the catalytic activity of the activated carbon declined markedly, so that to achieve an effluent E.M.F. of about −280, the flow rate had to be reduced to less than 20 ml. per minute. Still longer operation resulted in additional "poisoning," i.e., reduced catalytic activity, so that eventually the flow rate had to be cut to 16 ml./minute to achieve adequate reduction. Thus the overall catalytic activity had been so reduced that the original feed rate (above 30 ml./min.) had been diminished to only 16 ml./min., i.e., about a 50% reduction.

To regenerate the activated carbon and restore its catalytic activity, the column was drained and washed free of leach liquor and water soluble substances with boiling water (10 column volumes) over a period of 30 minutes. This was followed by feeding 7½ column volumes of hot (80° C.) 0.5% by weight aqueous sodium hydroxide over a second 30 minute period. Six column volumes of boiling water were used to wash out the residual alkali, and then 7½ column volumes of 2% aqueous sulfuric acid containing about .05% of sodium chlorate were fed hot (85–90° C.) over an additional 30 minute period. The column was washed with 6 column volumes of cold water over a period of 10 minutes and placed back on stream.

At a 35 ml./min. flow rate of the feed liquor and a $SO_2$ dosage of 89 ml. of 6% aqueous $SO_2$ for 10 liters of feed liquor, the effluent E.M.F. was now −240 mv. initially but shortly leveled off to an E.M.F. of −270 mv. Thus, the column efficiency was restored and the catalytic capacity or activity of the spent activated carbon was increased from a feed rate of <20 ml./min. to 35 ml./min. feed, i.e., an increase of 75%.

What is claimed is:

1. In a process for reducing ferric ion to ferrous ion in aqueous medium and in the presence of an activated carbon catalyst using a water soluble substance yielding a reducing ion selected from the group consisting of sulfite ion and bisulfite ion as the reductant wherein the catalyst is poisoned with continued use, the improvement comprising regenerating the poisoned activated carbon catalyst and recycling the regenerated activated carbon catalyst in the process for reducing ferric ion to ferrous ion, the poisoned activated carbon catalyst being regenerated by intimately contacting it with an aqueous solution and subsequent thereto with a second aqueous solution to improve the catalytic activity, one of the solutions being an aqueous alkaline solution and the other being an aqueous acidic solution.

2. The process of claim 1 wherein the poisoned activated carbon catalyst is contacted with a solution containing an oxidizing agent.

3. The process of claim 1 wherein a solution contacted with the poisoned activated carbon catalyst has a temperature of at least 60° C.

4. The process of claim 1 wherein the alkaline solution contains about 2–30% by weight of at least one alkaline substance selected from the group consisting of sodium, potassium and ammonium hydroxides, carbonates and bicarbonates, and the acidic solution is 0.3–12 normal in at least one mineral acid selected from the group consisting of sulfuric acid, nitric acid, hydrochloric acid and hydrofluoric acid.

5. The process of claim 4 wherein the poisoned activated carbon catalyst is regenerated by intimately contacting it in sequence with a first aqueous acidic solution, an aqueous alkaline solution, and a second aqueous acidic solution containing an oxidizing agent, at least one of the aqueous solutions having a temperature not less than 60° C.

6. In a process for reducing ferric ion to ferrous ion wherein an acidic leach liquor containing a substance providing ferric ion is passed through a bed of activated carbon catalyst and ferric ion is reduced to ferrous ion by means of a reductant which is a water-soluble substance yielding in aqueous solution a reducing ion selected from the group consisting of sulfite ion and bisulfite ion, the bed of catalyst being poisoned with continued use, the improvement comprising regenerating the bed of poisoned activated carbon catalyst and thereafter using the regenerated bed of activated carbon catalyst in the process for reducing ferric ion to ferrous ion, the bed of poisoned activated carbon catalyst being regenerated by eluting with an aqueous solution and subsequent thereto eluting with a second aqueous solution whereby the catalytic activity is improved, one of the solutions being an aqueous alkaline solution and the other being an aqueous acidic solution.

7. The process of claim 6 wherein the bed of poisoned activated carbon catalyst is eluted with a solution containing an oxidizing agent.

8. The process of claim 6 wherein at least one of the aqueous solutions used in eluting the bed of activated carbon catalyst has a temperature of at least 60° C.

9. The process of claim 6 wherein the alkaline solution contains 2–30% by weight of at least one alkaline substance selected from the group consisting of sodium, potassium and ammonium hydroxides, carbonates and bicarbonates, and the acidic solution is 0.3–12 normal in at least one mineral acid selected from the group consisting of sulfuric acid, nitric acid, hydrochloric acid and hydrofluoric acid.

10. The process of claim 9 wherein the bed of activated carbon catalyst is regenerated by eluting it in sequence with a first aqueous acidic solution, an aqueous alkaline solution and a second aqueous acidic solution containing an oxidizing agent, at least one of the solutions having a temperature not less than 60° C.

References Cited in the file of this patent

UNITED STATES PATENTS

| | | |
|---|---|---|
| 1,074,337 | Wijnberg | Sept. 30, 1913 |
| 1,189,896 | Wijnberg | July 4, 1916 |
| 1,327,222 | Blardone | Jan. 6, 1920 |
| 1,843,616 | Mackert | Feb. 2, 1932 |
| 2,455,260 | Meerdink | Nov. 30, 1948 |

FOREIGN PATENTS

| | | |
|---|---|---|
| 1,005 | Great Britain | 1866 |
| 2,902 | Great Britain | 1880 |